US005969512A

United States Patent [19]

Matsuyama

[11] Patent Number: 5,969,512

[45] Date of Patent: Oct. 19, 1999

[54] OUTPUT VOLTAGE VARIABLE POWER CIRCUIT

[75] Inventor: Hirotsugu Matsuyama, Tokyo, Japan

[73] Assignee: NEC Corporation, Tokyo, Japan

[21] Appl. No.: 08/979,147

[22] Filed: Nov. 26, 1997

[30] Foreign Application Priority Data

Nov. 26, 1996 [JP] Japan .................................... 8-315122

[51] Int. Cl.[6] .................................. G05F 1/40; H02J 1/00

[52] U.S. Cl. ............................ 323/272; 323/267; 307/87; 307/130

[58] Field of Search .................................... 323/272, 267, 323/268; 363/65, 71; 307/58, 82, 87, 44, 130

[56] References Cited

U.S. PATENT DOCUMENTS 4,352,053 9/1982 Oguchi et al. .......................... 323/220
5,691,630 11/1997 Chosa ...................................... 323/267
5,691,631 11/1997 Shimamori et al. .................... 323/272

FOREIGN PATENT DOCUMENTS 60-134921 7/1985 Japan .

*Primary Examiner*—Peter S. Wong
*Assistant Examiner*—Rajnikant B. Patel
*Attorney, Agent, or Firm*—Foley & Lardner

[57] ABSTRACT

The output of the power unit 21 varies on the basis of the output of the power unit 22, and temperature-compensated in accordance with an ambient temperature. The control is performed by the output voltage control circuit 3. The output voltage of the power unit 21 is varied with an output voltage ratio between the outputs of the power units, and by compensating an output voltage of the power unit 22 in accordance with the ambient temperature, the output voltage of the other power unit 21 can be temperature-compensated by the control circuit 3.

8 Claims, 6 Drawing Sheets

OUTPUT VOLTAGE VARIABLE POWER CIRCUIT

BACKGROUND OF THE INVENTION

1. Field of the Invention

The present invention relates to an output voltage variable power circuit for supplying a power voltage to a load, particularly to an output voltage variable power circuit which has a plurality of power units and operates them in parallel.

2. Description of the Prior Art

In this type of the output voltage variable power circuit heretofore used, each of plural power units has a reference voltage set by adjusting an output voltage variable resistor. Therefore, the more power units are operated in parallel, the more laborious the adjustment becomes. To solve the problem, as an example in which reference voltages of plural power units can be simultaneously set, a publication of patent application laid-open No. Sho 60-134921 discloses an output voltage variable circuit.

FIG. 7 is a functional block diagram showing a prior-art output voltage variable power circuit disclosed in the publication, which is constituted of a plurality of power units PSU1 to PSUn and a power control device 6. In the power control device 6, a power control portion 61 transmits a power starting signal and a power changing signal to the power units PSU1 to PSUn. The power changing signal is transmitted to the power units PSU1 to PSUn through a signal transmitting circuit 63. A digital signal generating circuit 62 is constituted of a constant-voltage source 62*a,* a volume 62*b* which can vary a power from the constant-voltage source 62*a* to take out an optional voltage, and a digital signal conversion circuit 62*c* for converting a value of the taken voltage to a digital signal. The digital signal determines the level of the power changing signal.

Since parallel-operating power units PSU1 to PSUn are the same in circuit constitution, the power unit PSU1 representing them is described. A bridge rectifier circuit 71 receives an alternate power from an input power 72, and converts the alternate power to a direct current. A pulse width control circuit 73 receives the power starting signal from the power control portion 61 of the power control device 6 and an error voltage signal from an error detector 74 to drive a drive circuit 75, and controls ON/OFF switching pulse widths of switching elements 76*a* and 76*b*. A direct-current intermittent wave which is obtained by switching on or off the switching elements 76*a* and 76*b* is transmitted by a transformer 77 to a secondary side, and rectified and smoothed by a rectifier smoothing circuit 78, so that a direct-current power is emitted from between output terminals l and m.

For error detecting resistors 79 and 80, to detect an output voltage between the output terminals l and m, one end of the error detecting resistor 79 is connected to a plus side of the output terminal l and one end of the error detecting resistor 80 is connected to a minus side of the output terminal m. A detecting voltage from a contact of the error detecting resistors 79 and 80 is transmitted to one input terminal of the error detector 74, while a reference voltage which is transmitted from a reference voltage setting circuit 81 and finely adjusted by an output voltage variable resistor 82 is transmitted to the other input terminal of the error detector 74.

An operation is now described using FIG. 7. Since the parallel-operating power units PSU1 to PSUn are the same in circuit constitution, the power unit PSU1 representing them is described.

First, the constant-voltage source 62*a* of the digital signal generating circuit 62 in the power control device 6 is varied in the volume 62*b* to take out the voltage, and the value of the taken voltage is converted to the digital signal in the digital signal conversion circuit 62*c*. The digital signal converted by the digital signal conversion circuit 62*c* is successively converted to an analog signal via the signal transmitting circuit 63, and transmitted to the reference voltage setting circuit 81 as the power changing signal. For the analog signal transmitted to the reference voltage setting circuit 81, the reference voltage emitted from the reference voltage setting circuit 81 is varied and finely adjusted by the output voltage variable resistor 82 to enter the error detector 74.

The error detector 74 compares the finely adjusted reference voltage with a detecting voltage which is obtained by dividing the output voltage between the output terminals l and m by the error detecting resistors 79 and 80, and transmits an error voltage signal to the pulse width control circuit 73. The pulse width control circuit 73 receives the error voltage signal to drive the drive circuit 75, and controls the ON/OFF pulse widths of the switching elements 76*a* and 76*b,* so that the output voltage between the output terminals l and m reaches a normal voltage determined by the reference voltage from the reference voltage setting circuit 81.

As aforementioned, in the power device in which the plural power units PSU1 to PSUn are provided with the power control device 6 in common, one volume 62*b* provided in the power control device 6 can simultaneously vary the reference voltages of the power units PSU1 to PSUn.

A first problem with the aforementioned prior art lies in that the reference voltage of the power units must be set from the outside. Usually, the power units (PSU) is integrated as a power IC, and the reference voltage setting circuit (81 in FIG. 7) for changing the reference voltage is not included in the IC. Namely, the reference voltage is fixed in the power IC and there is no terminal for changing the reference voltage. In this case, the reference voltage cannot be varied from the outside like the power control circuit in FIG. 7, and thus it is impossible to change the output voltages of the power units in parallel.

A second problem is that when the circuit is sued in, for example, an LCD display bias power or another power which needs to be considered with respect to an influence of an ambient temperature, the output voltage cannot be temperature-compensated.

SUMMARY OF THE INVENTION

An object of the present invention is to provide an output voltage variable power circuit in which even when a reference voltage is fixed inside each power unit and cannot be varied from the outside, an output voltage can be varied, and temperature-compensated in accordance with an ambient temperature.

Another object of the present invention is to provide an output voltage variable power circuit in which an output voltage ratio between the output power voltages of the power units is maintained even if one of the output power voltages is varied.

An output voltage variable power circuit of the invention has a first power unit for generating a first output power voltage, a second power unit for generating a second output power voltage, and a control circuit for controlling said first power unit to vary the first output power voltage responsive to a voltage variation of the second output power voltage.

The control circuit controls, responsive to the voltage variation of the second output power voltage, the first power unit to vary the first output power voltage for maintaining a voltage ratio between the first output power voltage and the second output power voltage ratio to be a predetermined value.

In definitely, the control circuit has a ratio detecting circuit for detecting the voltage ratio responsive to the first output power voltage and the second output power voltage and generating a ratio detecting signal for controlling the first power unit. The ratio detecting signal has a first value while the voltage ratio keeps the predetermined value.

The first power unit has an output voltage generating circuit for generating the first output voltage, and a control circuit for controlling the output voltage generating means to vary said first output power voltage responsive to the ratio detecting signal, until the ratio detecting signal becomes the first value.

The control circuit further has temperature-compensating circuit for controlling the second power unit for compensating the second output power voltage in accordance with an ambient temperature.

The control circuit further has an output voltage variable circuit which controls the second power unit for varying the second output power voltage responsive to an output voltage variable signal.

Another output voltage variable power circuit of the invention operates power units in parallel and has a reference power unit which generates a reference power voltage. It is constructed as follows:

1. an output voltage ratio detecting circuit for individually detecting output voltage ratios between the reference power voltage of the reference power unit and power voltages of the other power units, and generating ratio detecting signals;
2. output voltage variable signal means for generating an output voltage variable signal;
3. control means provided with a variable resistor for varying a resistance value in response to the output voltage variable signal so that the reference power voltage of the reference power unit can be varied, and generating a detecting signal associated with the resistance value;
5. first error detecting means for comparing the detecting signal transmitted from said control means with a first reference voltage; and
6. second error detecting means for comparing the ratio detecting signals transmitted from the output voltage ratio detecting means with reference voltages respectively.

DETAILED DESCRIPTION OF THE PREFERRED EMBODIMENTS

Figure 1:
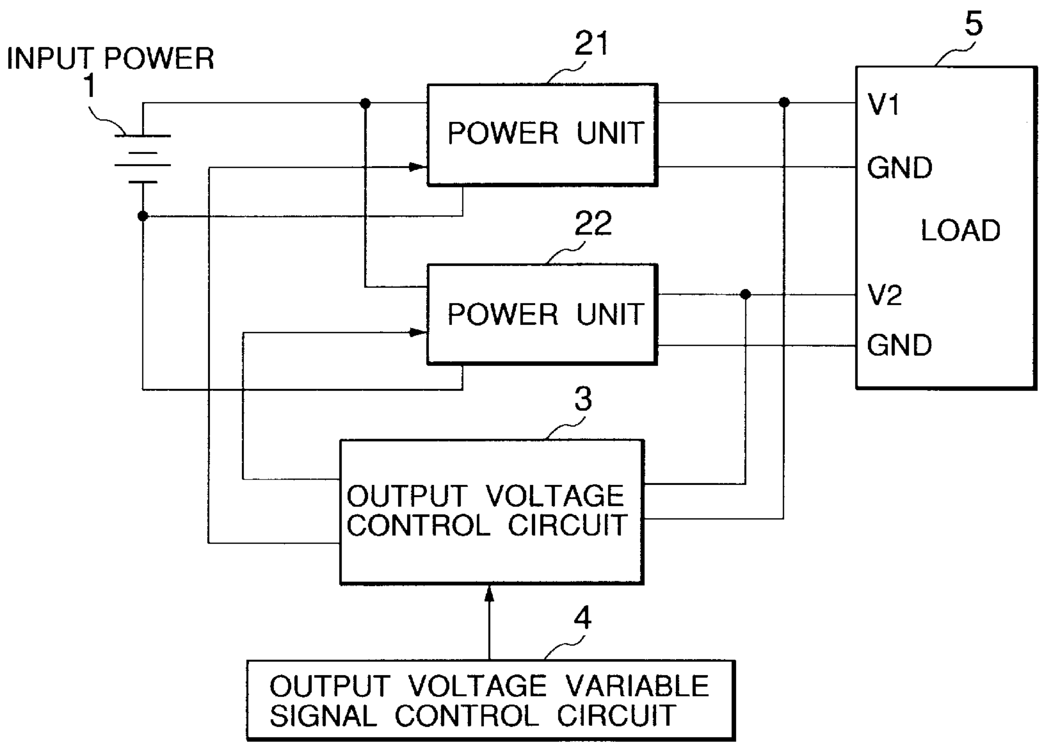
FIG. 1 is a abbreviated block diagram showing a first embodiment of an output voltage variable power circuit according to the present invention.

FIG. 1 is a abbreviated block diagram showing an output voltage variable power circuit of the first embodiment. The output voltage variable power circuit is constituted of an input power 1, plural parallel-operated power units (a first and a second power units) 21 and 22, an output voltage control circuit 3 which receives an output voltage variable signal from an output voltage variable signal control circuit 4. The output voltage variable signal is a digital signal. The power units 21 and 22 supply a first and a second output power voltages (hereinafter, output voltages) V1 and V2 to a load 5.

The output voltage control circuit 3 controls the power unit 21 to vary the first output voltage V1 of the power unit 21 responsive to a voltage variation of the second output voltage V2 of the power unit 22. Further, the output voltage control circuit 3 executes a variable control of output voltages of the power units 21 and 22 responsive to the output voltage variable signal from the output voltage variable signal control circuit 4.

Figure 2:
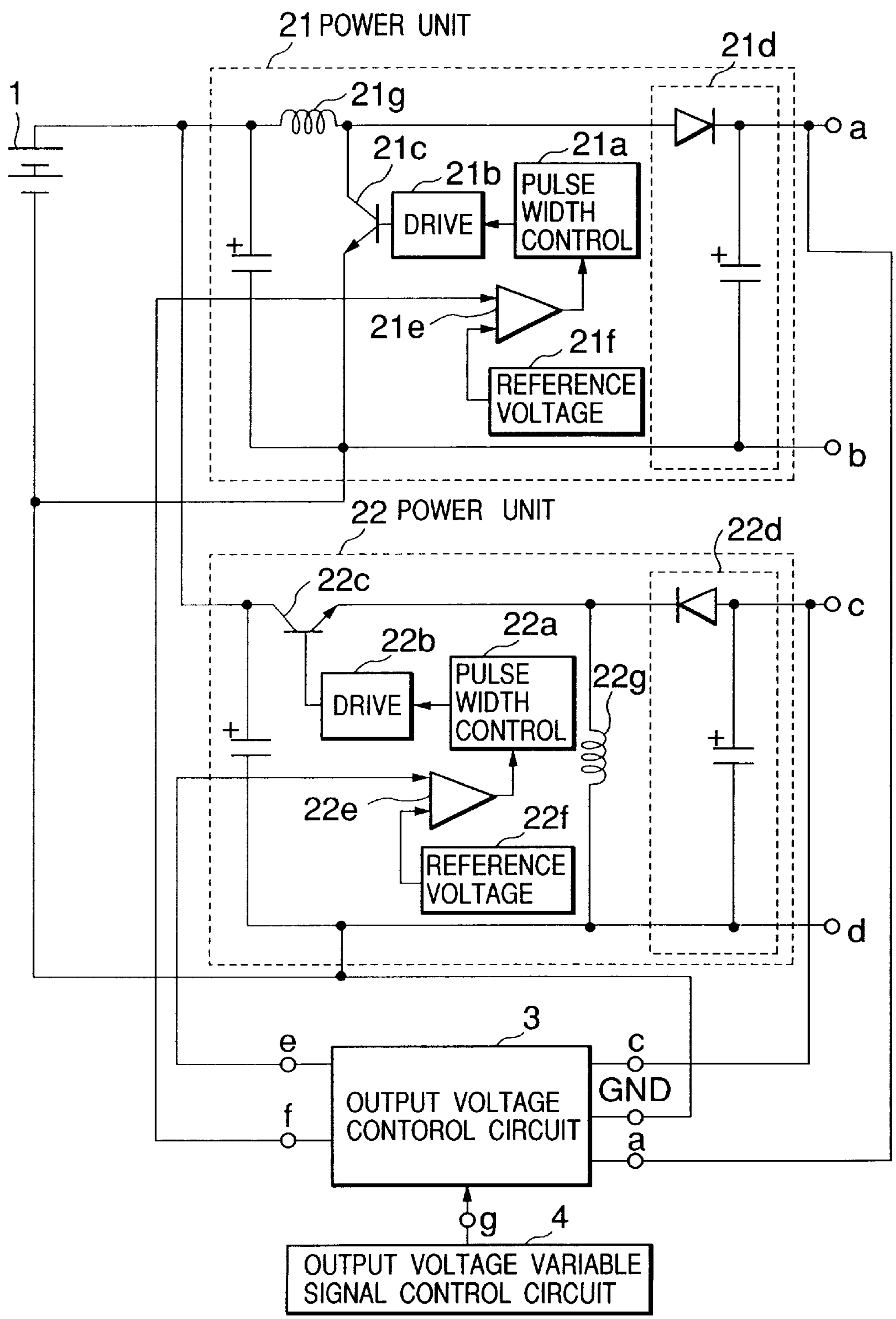
FIG. 2 is a detailed block diagram showing the output voltage variable power circuit of FIG. 1.

FIG. 2 is a detailed block diagram of FIG. 1. Here, the power unit 21 is used for the output of a positive voltage and the power unit 22 is for the output of a negative voltage. The output voltage V1 at a positive output terminal a is +15(V), and the output voltage V2 at a negative output terminal c is −11(V).

In the power unit 21, a pulse width control circuit 21*a* drives a drive circuit 21*b* to control a switching pulse width. The drive circuit 21*b* drives a switching transistor 21*c* for turning on/off to generate a pulse voltage. An collector and emitter of the switching transistor 21*c* are connected to choke coil 21*g* and a terminal b connected to a Ground (GND). A rectifier smoothing circuit 21*d* rectifies and smoothes the pulse voltage from the switching element 21*c* to emit a positive-voltage direct-current power from between output terminals a and b. An error detector 21*e* compares a voltage from a terminal f of the output voltage control circuit 3 with a reference voltage +0.2 (V) from a reference voltage generator 21*f,* and transmits an error voltage signal to the pulse width control circuit 21*a*.

In this power unit 21, the output generating circuit is the coil 21*g,* condensers and the rectifier smoothing circuit 21*d.* The output voltage V1 is determined by the ON/OFF period of the switching transistor 21*c*. The ON/OFF control is performed by the pulse width control circuit 21*a* and the error detector 21*e*.

In the power unit 22, a pulse width control circuit 22*a* drives a drive circuit 22*b* to control a switching pulse width. The drive circuit 22*b* drives a switching transistor 22*c* for turning on/off to generate a pulse voltage. An collector and emitter of the switching transistor 21*c* are connected to the input power 1 and a choke coil 22*g*. The choke coil 22*g* is connected parallel to a rectifier smoothing circuit 22*d*. The rectifier smoothing circuit 22*d* rectifies and smoothes a pulse voltage from the switching element 22*c* to emit a negative-voltage direct-current power from between output terminals c and d. An error detector 22*e* compares a voltage from a terminal e of the output voltage control circuit 3 with a reference voltage +0.2(V) of a reference voltage generator

22*f* and transmits an error voltage signal to the pulse width control circuit 22*a*.

In this power unit 22, the output generating circuit is the coil 22*d*, condensers and the rectifier smoothing circuit 22*g*. The output voltage V2 is determined by the ON/OFF period of the switching transistor 22*c*. The ON/OFF control is performed by the pulse width control circuit 22*a* and the error detector 22*e*.

Figure 3:
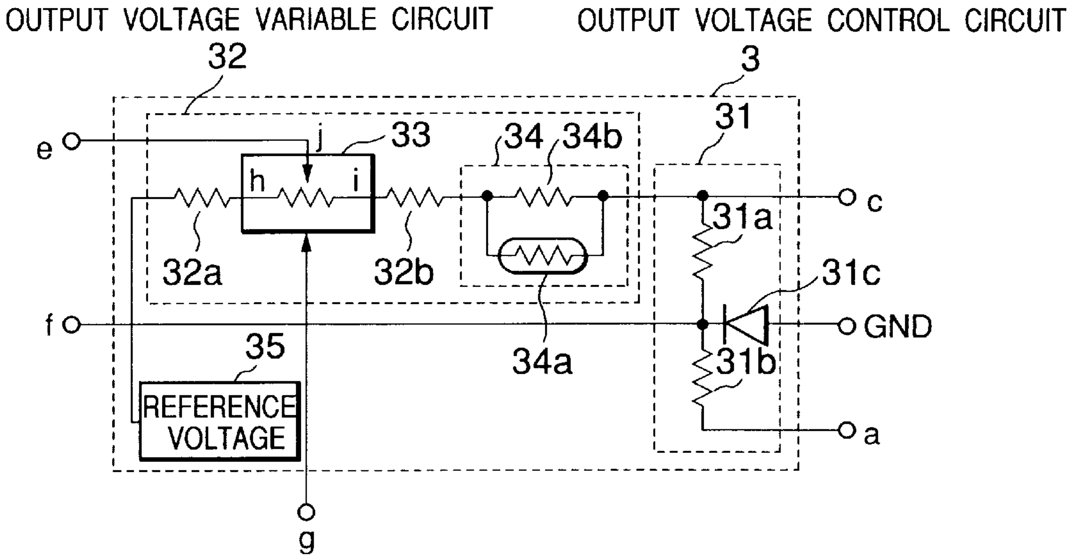
FIG. 3 is a circuit diagram showing an output voltage control circuit used in the first embodiment of the invention.

FIG. 3 is a circuit diagram of the output voltage control circuit 3 in the first embodiment of the invention. The output voltage control circuit 3 has an output voltage ratio detecting circuit 31 connected to output terminals a and c of the power units 21 and 22 in FIG. 2, an output voltage variable circuit 32 and a reference voltage 35.

The output voltage ratio detecting circuit 31 detects a change of a voltage ratio between the positive output voltage of the power unit 21 (FIG. 2) and the negative output voltage of the power unit 22 (FIG. 2). Detecting resistors 31*a* and 31*b* are connected in series between the positive voltage output terminal a of the power unit 21 and the negative voltage output terminal c of the power unit 22. One end of the detecting resistor 31*b* is connected to the positive voltage output terminal a, and one end of the detecting resistor 31*a* is connected to the negative voltage output terminal c.

A terminal f is a common terminal of the detecting resistors 31*a* and 31*b*. The terminal f is connected to one input terminal of the error detector 21*e* (FIG. 2) of the power unit 21, and transmits a detecting voltage representing an output voltage ratio between the positive voltage output terminal a and the negative voltage output terminal c. If the negative output voltage at the terminal c is changed, the detecting voltage at the terminal f is also changed to control the power unit 21 on the bases of the detecting voltage. When the output voltages of the terminals a and c keep +15 (V) and −11 (V), the detecting voltage at the terminal f keeps +0.2 (V) which equals to the reference voltage of the reference voltage generator 21*f* in FIG. 2. The detecting voltage at the terminal f and the reference voltage prefer to be 0 to 0.5 (V) to detect the output voltage ratio exactly.

Additionally, in FIG. 3, between the terminal f and GND, a diode 31*c* with less reverse voltage current is connected to prevent the terminal f from being a negative voltage and destroying the error detector 21*e* (FIG. 2) of the power unit 21.

Further, in FIG. 3, the output voltage variable circuit 32 is provided between the negative voltage output terminal c of the power unit 22 (FIG. 2) and the reference voltage generator 35, for detecting an output voltage of the power unit 22 (FIG. 2). A digital potentiometer 33 receives the output voltage variable (digital) signal transmitted via a terminal g from the output voltage variable signal control circuit 4 in FIG. 2. Responsive to the output voltage variable signal from the terminal g, the digital potentiometer 33 sets resistance values between terminals h and j and between terminals i and j to determine a voltage at the terminal j. The determined voltage at the terminal j is transmitted, through a terminal e, to one input terminal of the error detector 22*e* (FIG. 2) of the power unit 22.

Also, to prevent the terminal e from being a negative voltage and destroying the error detector 22*e* of the power unit 22, the reference voltage generator 35 in FIG. 3 supplies a positive reference voltage to the resistance 32*a*. The resistor 32*a* limits a current relative to a variable resistance value between the terminals h and j of the digital potentiometer 33, and a resistor 32*b* limits a current when a temperature compensation circuit 34 is not provided.

Figure 4:
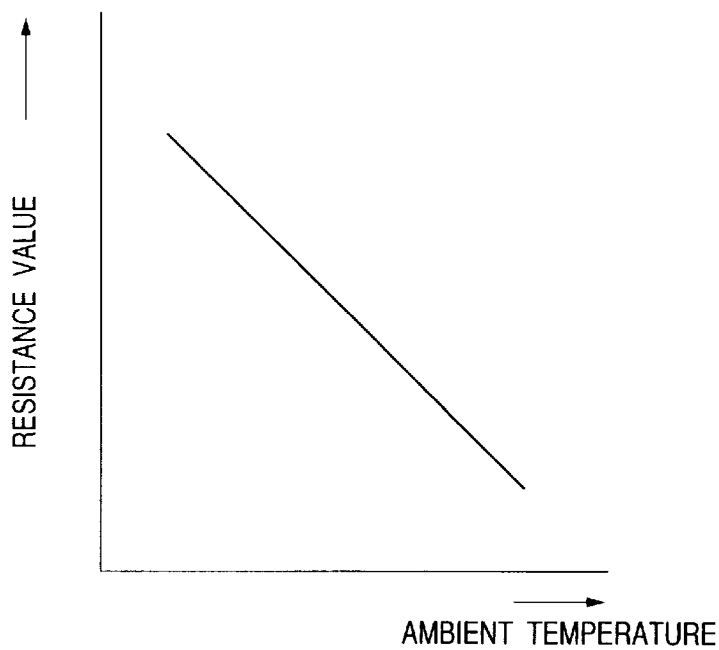
FIG. 4 is a graph showing a characteristic of a resistance value between both ends of a temperature compensation circuit relative to an ambient temperature of the first embodiment.

In the temperature compensation circuit 34 in FIG. 3, a thermistor 34*a* is connected parallel to a resistor 34*b* to make constant negative variations in the resistance values with respect to the ambient temperatures. FIG. 4 shows a characteristic of resistance values between both ends of the temperature compensation circuit 34 relative to ambient temperatures.

The resistance value between both ends of the temperature compensation circuit 34 increases (or decreases) in accordance with the decreases (or increases) of the ambient temperature. Thus, a ratio between a first resistance value between both ends of the output voltage variable circuit 32 and a second resistance value at the terminal j of the digital potentiometer 33, is varied responsive to the ambient temperature. Therefore, the voltage value at the terminal j is varied by the ambient temperature to control the output voltage of the power unit 22 (FIG. 2). Also, a voltage ratio detected by the output voltage ratio detecting circuit 31 is used for controlling the output voltage of the power unit 21.

An operation of the first embodiment of the invention is now detailed referring to FIGS. 2 and 3.

The output voltage variable signal control circuit 4 transmits the output voltage variable signal to the output voltage control circuit 3. Here, the case of transmitting the output voltage variable signal for lowering the negative output voltage −11 (V) to −14 (V) (that is; for increasing the absolute value of the negative output voltage) of the power unit 22 is described.

In FIG. 2, when the output voltage control circuit 3 receives the output voltage variable signal from the control circuit 4 for lowering the negative output voltage of the power unit 22 to −14 (V), the resistance value between the terminals i and j (FIG. 3) of the digital potentiometer 33 increases, and the resistance value between the terminals h and j decreases. Thus, the detecting voltage of the terminal j (and terminal e) of the digital potentiometer 33 increases.

The error detector 22*e* of the power unit 22 compares the increased detecting voltage transmitted from the output voltage control circuit 3 with the reference voltage from the reference voltage generator 22*f*. then the error detector 22*e* transmits an error voltage signal to the pulse width control circuit 22*a*. The error signal represents the difference between the increased detecting voltage and the reference voltage. The pulse width control circuit 22*a*controls the drive circuit 22*b* to increase an ON period of the ON/OFF pulse width of the switching transistor 22*c* in accordance with the error signal. Thus, the negative output voltage start being lowered so as to become −14 (V).

The negative voltage value of the power unit 22 is lowered until the detecting voltage from the terminal j (FIG. 3) of the digital potentiometer 33 reaches the same value as the reference voltage 22*f*. When the negative voltage of the negative voltage output terminal c of the power unit 22 lowers, the detecting voltage representing the output voltage ratio from the terminal f (FIG. 3) also lowers under +0.2 (V).

The lowering detecting voltage from the terminal f is applied to the error detector 21*e* (FIG. 2) of the power unit 21. The error detector 21*e* compares the detecting voltage with the reference voltage of +0.2 (V) from the reference voltage generator 21*f*, and transmits an error voltage signal to the pulse width control circuit 21*a*. Then, the pulse width control circuit 21*a* controls the drive circuit 21*b* to increase an ON period of the ON/OFF pulse width of the switching transistor 21*c*, and thus the voltage value of the positive output voltage of the terminal a increases. The increasing operation of the positive output voltage is continued until the detecting voltage f becomes +0.2 (V). As a result, the positive output voltage of the power unit 21 increases so that the output voltage ratio between the negative output voltage of the power unit 22 and the positive output voltage of the power unit 22 is maintained to a predetermined value of −11 (V):+15 (V). Therefore, the increase of the voltage at the positive voltage output terminal a of the power unit 21 is performed for stabilizing a constant output voltage ratio. Finally, the positive output voltage becomes about +19 (V). This is because the ratio of +15 (V):−11 (V) almost all equals to +19 (V):−14 (V).

An output voltage variable operation of the temperature compensation circuit 34 is now detailed.

When the ambient temperature decreases, the resistance value between both ends of the temperature compensation circuit 34 increases, and the detecting voltage of the terminal j of the digital potentiometer 33 arises. The error detector 22*e* of the power unit 22 compares the increased detecting voltage transmitted from the output voltage control circuit 3 with the reference voltage of the reference voltage generator 22*f*, and transmits the error voltage signal to the pulse width control circuit 22*a*. The pulse width control circuit 22*a* controls the drive circuit 22*b* to reduce the ON period of the ON/OFF pulse width of the switching transistor 22*c*. Then the negative output voltage of the negative voltage output terminal c of the power unit 22 starts lowering (that is; the absolute value of the negative output voltage increases). The negative output voltage of the power unit 22 lowers until the detecting voltage from the terminal j of the digital potentiometer 33 reaches the same value as the reference voltage of the generator 22*f*.

When the voltage of the negative voltage output terminal c of the power unit 22 is lowered, the detecting voltage from the terminal f decreases, because the output ratio between the positive and negative voltage output terminals a and c are changed. Then the error detector 21*e* of the power unit 21 compares the decreased detecting voltage transmitted from the output voltage control circuit 3 with the reference voltage of the generator 21*f*, and transmits the error voltage signal to the pulse width control circuit 21*a*. The pulse width control circuit 21*a* controls the drive circuit 21*b* to increase the ON period of the ON/OFF pulse width of the switching transistor 21*c*. As a result, the positive output voltage of the power unit 21 starts arising so that the output voltage ratio relative to the voltage of the negative voltage output terminal c is kept constant.

When the voltage of the negative voltage output terminal c of the power unit 22 stops decreasing, thereby eliminating the difference of the detecting voltage between the voltages of the positive voltage output terminal a of the power unit 21 and the negative voltage output terminal c of the power unit 22 from the reference voltage 21*f*, then the increase of the voltage of the positive voltage output terminal a of the power unit 21 is stabilized as the constant output voltage ratio.

Figure 5:
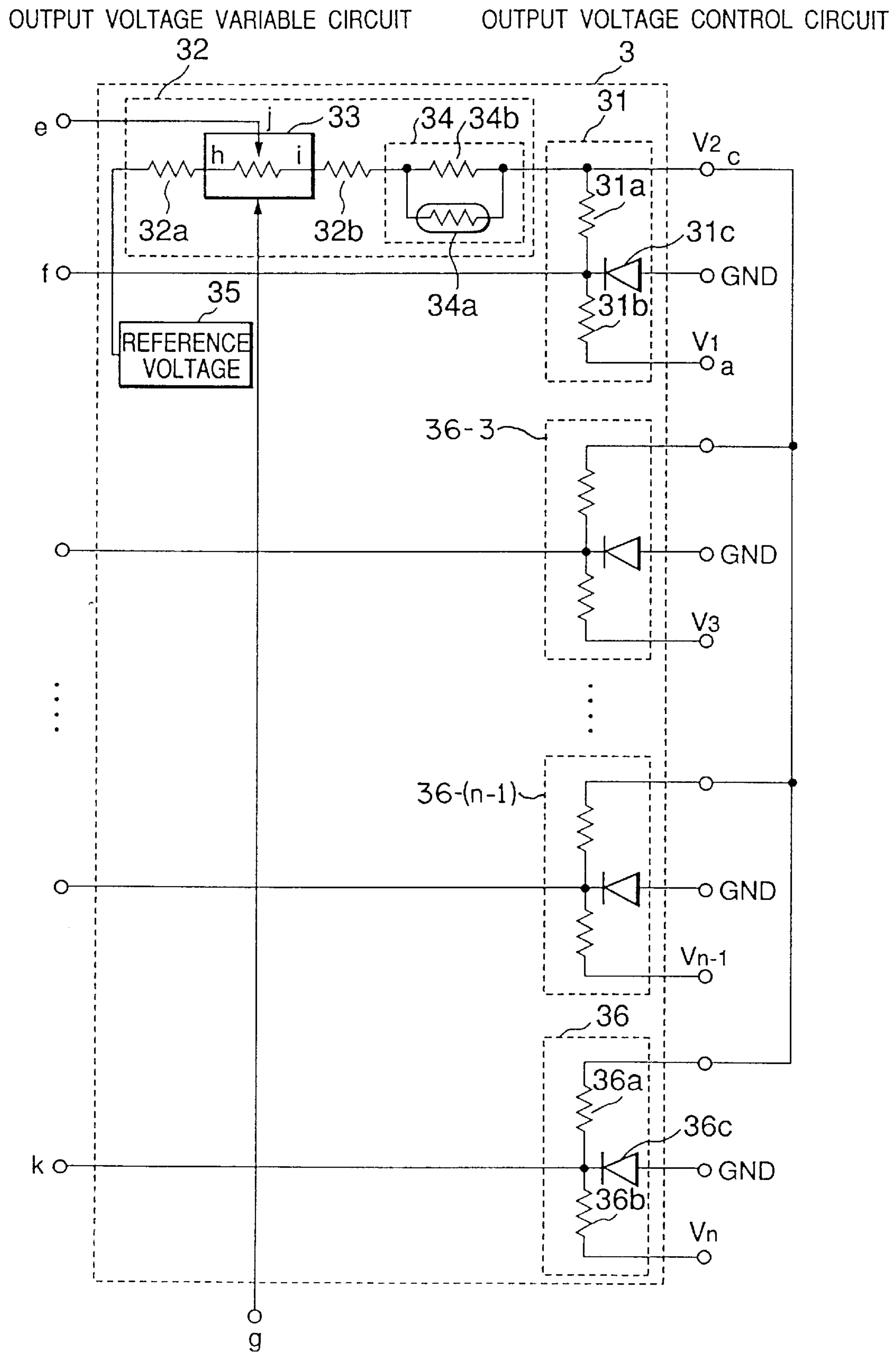
FIG. 5 is a circuit diagram showing an output voltage control circuit used in a second embodiment of the invention.

A second embodiment of the invention is detailed referring to FIG. 5.

FIG. 5 is a circuit diagram showing a constitution of an output voltage control circuit in the second embodiment. As shown in FIG. 2, the first embodiment of the invention uses the first and second power units 21 and 22; however, the second embodiment uses third to n-th power units for outputting positive output voltages V3 to Vn (n is an integer). Since the structures of the third to n-th power units are the same as the power unit 21 in FIG. 2 except the ON/OFF pulse width of the switching transistor 21*c*, drawings of the power units are not shown.

In FIG. 5, the output voltage control circuit 3A is provided with an output voltage variable circuit 32 for varying the output voltage of a second power unit 22 in FIG. 2 and the output voltage ratio detecting circuits 31 and the same circuits 36-3 to 36-n for detecting an output voltage ratio of second and third to n-th power units. For example, the circuit 31 detects an output voltage ratio of the first power unit 21 and the second power unit 22, and the circuit 36-n detects an output voltage ratio of the n-th power unit and the second power unit 22.

An output voltage V2 of the reference second power unit is connected to one terminal of each of the circuits 36-3 to 36-n for detecting the output voltage ratios with the other power units.

In the output voltage ratio detecting circuit 36-n, a detecting voltage from a terminal k of output voltage ratio detecting resistors 36*a* and 36*b* is transmitted to one input terminal of an error detector of the n-th power unit. Since the subsequent operation is the same as that of the first power unit 21 in the first embodiment, the description thereof is omitted.

Figure 6:
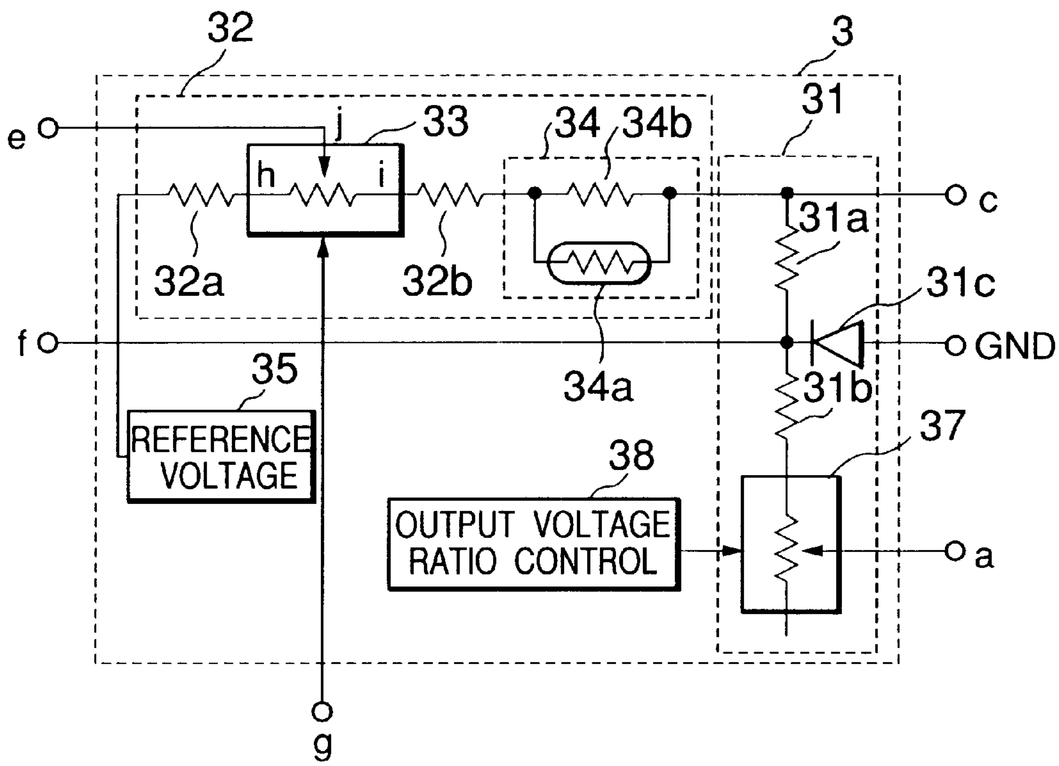
FIG. 6 is a circuit diagram showing an output voltage control circuit used in a third embodiment of the invention.
Figure 7:
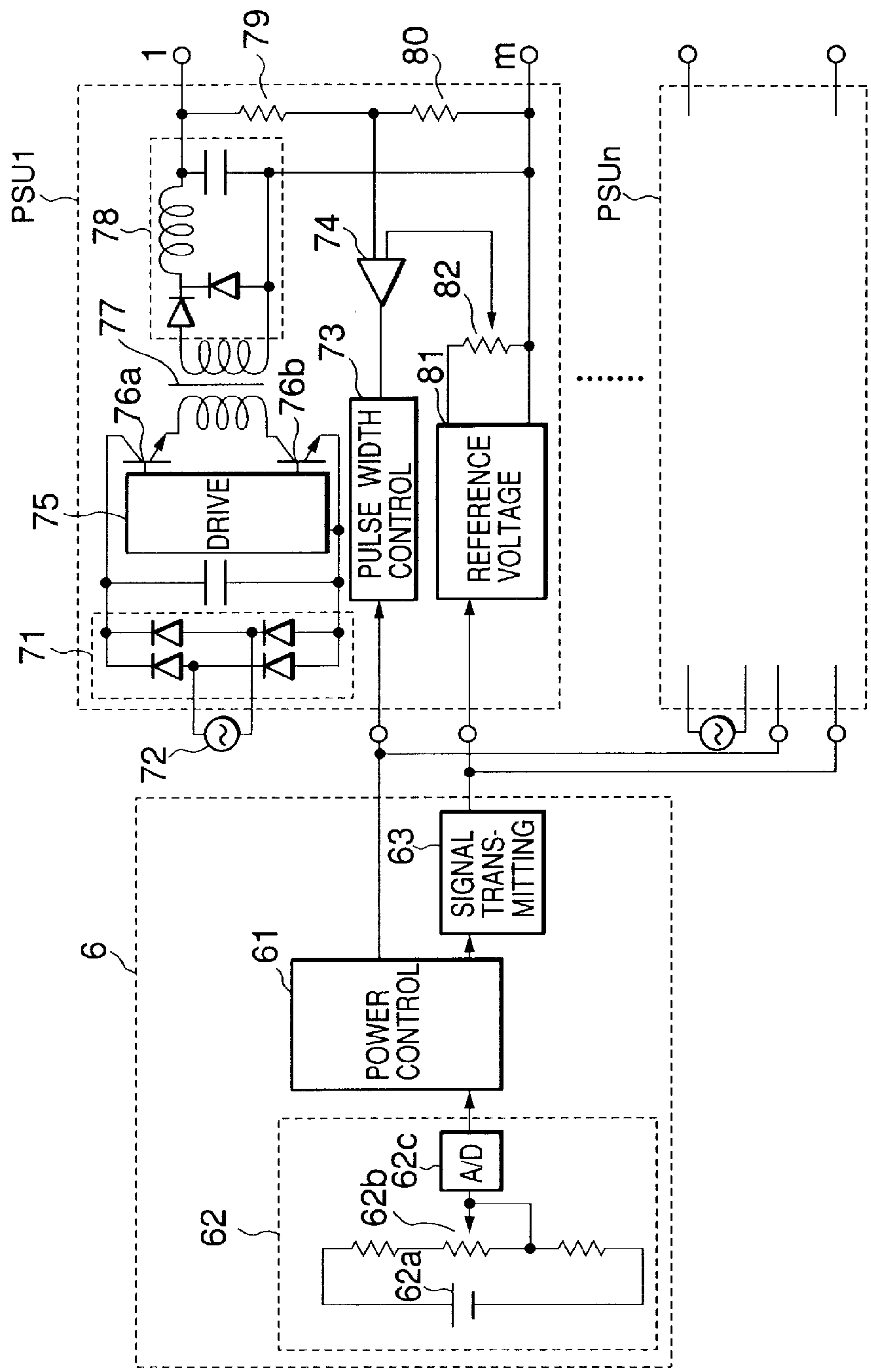
FIG. 7 is a functional block diagram showing a prior-art output voltage variable power circuit.

A third embodiment of the invention is now detailed referring to FIG. 6.

FIG. 6 is a circuit diagram showing a constitution of an output voltage control portion in the third embodiment. Different from the first and third embodiments in which the output voltage ratio of the second power unit 22 and the other power units is fixed, in the third embodiment, between the output voltage ratio detecting resistor 31*b* and one output voltage terminal, a digital potentiometer 37 is added. By controlling the digital potentiometer 37 by an output voltage ratio control portion 38, the output voltage ratio between the reference power unit and the other power units can be varied an controlled.

In the above, the first and second embodiments of the invention in which the power units have the reference voltages fixed. However, it is clear that the invention can also be applied to the power unit having a variable reference voltage.

A first effect of the invention lies in that the reference voltage is fixed in each power unit, and even in the power unit whose reference voltage cannot be varied from the outside, the output voltage can be varied without changing the reference voltage.

As a second effect, since the output voltage can be temperature-compensated in accordance with the ambient temperature, for use in an LCD display bias power or the like, an output voltage variable circuit can be provided in which an LCD display can be performed without being influenced by the ambient temperature.

What is claimed is:

1. An output voltage variable power circuit comprising:

a first power unit for generating a first output power voltage;

a second power unit for generating a second output voltage; and a control circuit for controlling said first power unit to vary said first output power voltage responsive to a voltage variation of said second output power voltage;

said control circuit controls, responsive to the voltage variation of said second output power voltage, said first power unit to vary said first output power voltage for maintaining a voltage ratio between said first output power voltage and said second output power voltage ratio to be a predetermined value.

2. The output voltage variable power circuit as claimed in claim 1, wherein said control circuit comprises, ratio detecting means for detecting said voltage ratio responsive to said first output power voltage and said second output power voltage and generating a ratio detecting signal for controlling said first power unit, said ratio detecting signal having a first value while said voltage ratio being said predetermined value.

3. The output voltage variable power circuit as claimed in claim 2, wherein said first power unit comprises output voltage generating means for generating said first output voltage, and control means for controlling said output voltage generating means to vary said first output power voltage responsive to said ratio detecting signal, until said ratio detecting signal becomes said first value.

4. The output voltage variable power circuit as claimed in claim 2, wherein said control circuit further comprises temperature-compensating means for controlling said second power unit for compensating said second output power voltage in accordance with an ambient temperature.

5. The output voltage variable power circuit as claimed in claim 2, wherein said control circuit further comprises an output voltage variable circuit which controls said second power unit for varying said second output power voltage responsive to an output voltage variable signal.

6. An output voltage variable power circuit for operating power units in parallel and having a reference power unit which generates a reference power voltage comprising:

output voltage ratio detecting means for individually detecting output voltage ratios between the reference power voltage of the reference power unit and power voltages of the other power units, and generating ratio detecting signals;

output voltage variable signal means for generating an output voltage variable signal;

control means provided with a variable resistor for varying a resistance value in response to said output voltage variable signal so that the reference power voltage of the reference power unit can be varied, and generating a detecting signal associated with said resistance value;

first error detecting means for comparing said detecting signal transmitted from said control means with a first reference voltage; and second error detecting means for comparing said ratio detecting signals transmitted from said output voltage ratio detecting means with reference voltages respectively.

7. The output voltage variable power circuit as claimed in claim 6, further comprising a temperature compensation circuit for changing the resistance value in accordance with an ambient temperature so that the reference power voltage of said reference power unit can be varied.

8. The output voltage variable power circuit as claimed in claim 6, wherein said output voltage ratios are variable.

* * * * *